United States Patent
Kozko et al.

(10) Patent No.: US 9,007,587 B1
(45) Date of Patent: Apr. 14, 2015

(54) DETERMINING TRUE SURFACE COLOR FROM MULTIPLE CAMERA IMAGES PROVIDING CONFLICTING COLOR INFORMATION

(71) Applicants: Dmitry Kozko, Aventura, FL (US); Ivan G. Onuchin, Hollywood, FL (US); Nikolay Shturkin, Yekaterinburg (RU)

(72) Inventors: Dmitry Kozko, Aventura, FL (US); Ivan G. Onuchin, Hollywood, FL (US); Nikolay Shturkin, Yekaterinburg (RU)

( * ) Notice: Subject to any disclaimer, the term of this patent is extended or adjusted under 35 U.S.C. 154(b) by 0 days.

(21) Appl. No.: 14/145,023

(22) Filed: Dec. 31, 2013

(51) Int. Cl.
 *G01J 3/46* (2006.01)
(52) U.S. Cl.
 CPC ........................................ *G01J 3/462* (2013.01)
(58) Field of Classification Search
 USPC ................................................ 356/402–425
 See application file for complete search history.

(56) References Cited

U.S. PATENT DOCUMENTS

2014/0126835 A1* 5/2014 Shioya .......................... 382/274

* cited by examiner

*Primary Examiner* — Abdullahi Nur
(74) *Attorney, Agent, or Firm* — Patents on Demand P.A.; Brian K. Buchheit; Scott M. Garrett

(57) ABSTRACT

A set of images of an object are captured from a set of lenses positioned at different angles. A common point is determined, which has a color value that differs among the images. Color at the point is mathematically expressed as a set of equations. The equations comprise a recorded color value for the point, an ambient contribution, a diffuse contribution, and a specular contribution. The ambient and diffuse contributions are set as equal across the equations. The specular contribution is determined, such as by quantifying the light sources and solving for the specular contribution using a Phong lighting model equation. True color for the point, which is based on the ambient and diffuse contribution, is determined by solving a set of simultaneous equations once the specular contribution is known. An image is created where the point has the true color as determined above.

20 Claims, 4 Drawing Sheets

Light Captured By Camera at Point = D (Diffuse) + A (Ambient) + S (Specular)

DETERMINING TRUE SURFACE COLOR FROM MULTIPLE CAMERA IMAGES PROVIDING CONFLICTING COLOR INFORMATION

BACKGROUND

The present invention relates to the field of color reproduction and, more particularly, to determining true surface color of a surface from multiple camera images providing conflicting color information.

Cameras with multiple fixed lenses are increasingly being utilized to capture imagery in an arc which is greater than what a single lens is able to provide. For any given point, however, the different camera lenses record different color values. These differences are primarily a result of specular reflection. Semi-reflective surfaces are of particular concern for color accuracy. For example, if a red semi-reflective surface is fifty percent diffuse and fifty percent reflective and a light source is white, then color of the surface as captured by a camera lens will appear from red to white color depending on viewing angle and the intensity of the white light source.

Differences in color from different images must be resolved if the images are to be stitched together to form a cohesive scheme. When combining content from different images into a single one, conventional techniques generally try to smooth the color differences, which results in a cohesive combined image. The resulting image, however, does not accurately represent the true color of the object being captured. For semi-reflective surfaces, color accuracy resulting from conventional techniques can be particularly poor. Stated differently, conventional techniques for combining points captured by multiple lenses fail to produce photorealistic images. Which is a problem heretofore unresolved.

Additionally, many image analysis techniques assume an object's true color is represented. These techniques yield inaccurate results when this assumption is incorrect. For instance, color of an image is often used to determine a shape of a reconstructed surface. The more accurate the color; the more accurate the determined shape. Embodiments of the disclosure ensure true color of surfaces is maintained when new images are being generated by stitching together a set of images captured using different lenses positioned at different angles relative to a surface.

DETAILED DESCRIPTION

Figure 1:
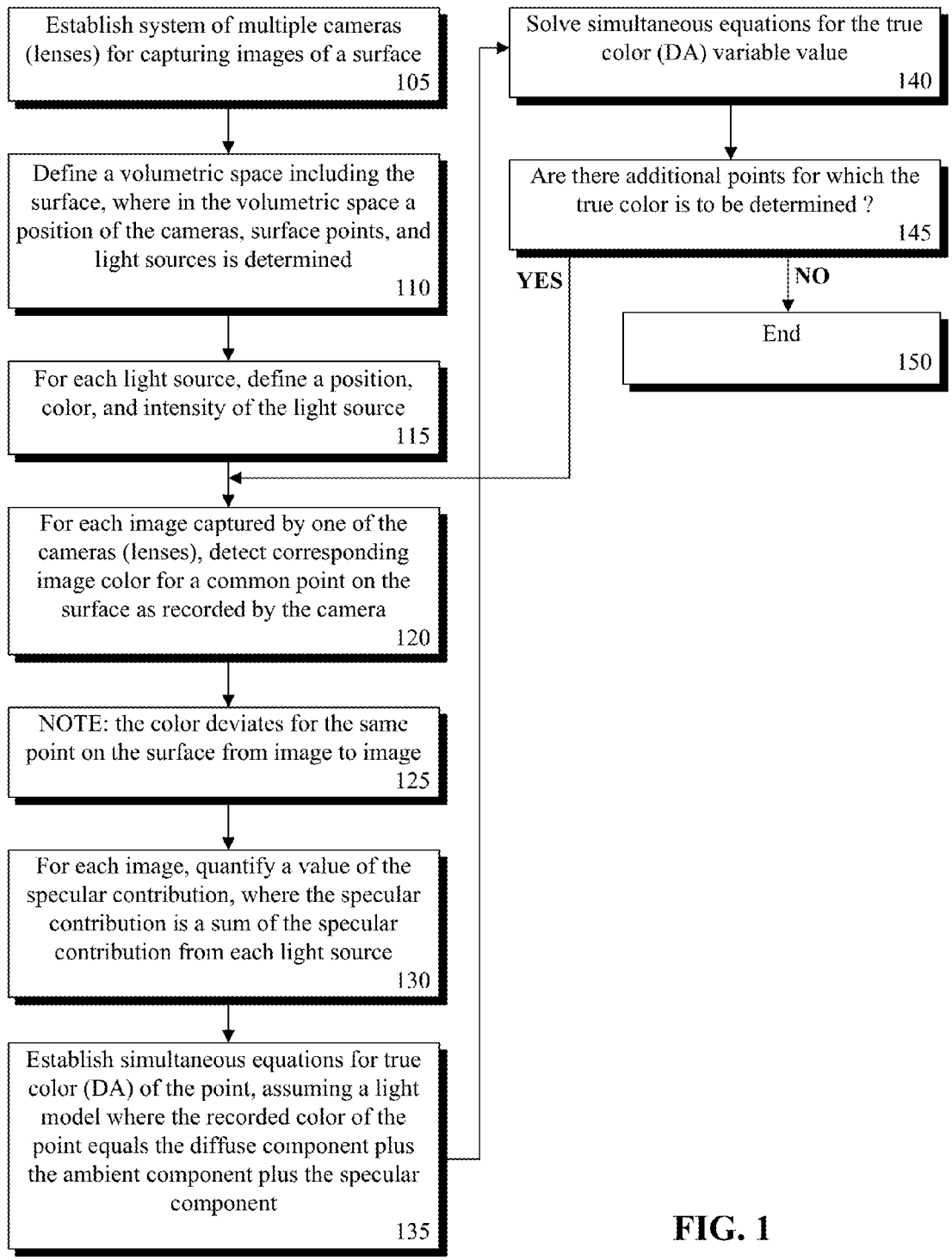
FIG. 1 shows a flowchart for determining accurate color of semi-reflective surfaces captured from multiple different camera lenses and angles in accordance with embodiments of the disclosure.

The disclosure presents an innovation for improving color accuracy of images. The color improvements result from using lenses at different angles to capture an image of a point. These different angles for viewing a common point on a surface may result in different captured colors, when the surface is a semi-reflective one. One application of the innovation is to improve color realism for images created by combining multiple images from multiple different lenses. The disclosed technique greatly improves color accuracy for semi-reflective surfaces, which are especially sensitive to different angles.

To elaborate, assume that each camera lens captures light having ambient, diffuse, and specular contributions. For a point (vertex), final illumination can equal ambient+diffuse+specular contributions. For changes in camera angles, the ambient and diffuse contributions for color of a camera captured image are relatively insensitive to angle. That means that for a set of ideal camera lenses capturing a color at a point of a surface, the ambient and diffuse contributions to color will be equal (at least in regard to recorded color at a surface point) across camera lenses regardless of camera angle. Thus, any deviations in color from different lenses of a common scene for a point or set of points are primarily a result of specular contributions (which are sensitive to angle).

The disclosure calculates the specular contributions for a vertex (or set of points) for each image captured from one of a set of different lenses. These specular contributions are mathematically removed from the equation, diffuse and ambient contributions are retained. This diffuse and ambient contribution combination represents a true color of the vertex or set of points. Not all embodiments of the disclosed invention need utilize both ambient and diffuse contributions, and derivative embodiments (where true color is based solely on a diffuse contribution for example) are contemplated and are to be considered within scope of the disclosure.

When generating an image that stitches together content from a set of images, color of the generated image is based on this computed true color. Inconsistencies in true color calculations across multiple images from different lenses will be minor compared to the deviations resulting from the specular contributions, which have been removed. Thus, the disclosed technique results in colors of combined images being more accurate and precise than would be otherwise possible. Photorealistic color within a photograph is therefore possible, though none of the individual images from individual camera lenses provides images having a photorealistic color.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning to the Figures, FIG. 1 shows a flowchart for determining accurate color of semi-reflective surfaces captured from multiple different camera lenses and angles in accordance with embodiments of the disclosure. In step 105, a system can be established where multiple different camera lenses capture images of a surface. In one embodiment, the multiple different camera lenses can be fixed lenses of a single camera device. These fixed lenses can cover a same relative region (using stereoscopic imagery techniques for depth capture for three dimensional images) or can cover different environmental regions, where some overlap between the different regions exists (and where color differences will exist for the same point within the regions of overlap). In another embodiment, different cameras can be utilized to capture the images. Any arrangement may be used so long as significantly different angles are available to lenses capturing a point on a surface of an object.

In step 110, a volumetric space can be defined for computational purposes. This volumetric space can include the object/surface being captured by two or more lenses, the lenses themselves, and a set of one or more light sources. Relative positions and angles of the lenses, light sources, and surface are defined for the volumetric space. The volumetric space models relative positions of objects and angles, where the volumetric space includes all relevant data needed for illumination model calculations, as described herein. In one embodiment, positions for the light sources may be initially unknown. When this is the case, these positions can be calculated, as shown by step 115. If the position and intensity of the light source(s) are known (possibly by using environmental sensors) calculations detailed for embodiments of step 115 are unnecessary.

In step 115, for each light source, a position, color, and intensity for the light source can be defined. Quantifying these light source variables can be performed in numerous manners, such as using direct measured values from light sensing equipment, using calculations based on imagery, and combinations thereof. Assuming light sources are quantified by calculations, these calculations may utilize images from the multiple lenses by taking multiple different points common among images from different lenses. Known calculation techniques can be applied at this step, which generally utilize linear equations with uncertainty to calculate a number of light sources, light source positions, light source colors, and light source intensities for all light sources significantly affecting the volumetric space. For example, Planckian locus or black body locus can be used for these calculations, as detailed in numerous publications such as the document titled "Method and Measuring and Specifying Colour Rendering Properties of Light Sources" having ISBN 9783900734572.

Once light sources have been quantified, color information for a set of one or more surface points or vertex can be identified, as shown by step 120. The same point (or set of points) is captured by multiple lenses at this step. Color the point (or set of points) as captured by each different lens will have appreciable deviations, at this stage, which is noted by step 125.

It can be assumed that the point of color for each image is able to be represented using a mathematical equation with variable values for diffuse, ambient, and specular contributions. So if C1, C2, and C3 represent color values for the same point from different cameras, the following equations apply:

$$C_1 = A_1(\text{Ambient}) + D_1(\text{Diffuse}) + S_1(\text{Specular})$$

$$C_2 = A_2 + D_2 + S_2$$

$$C_3 = A_3 + D_3 + S_3$$

It should be understood that the above simple models for color are not the only equations that are able to be utilized, and that the disclosure contemplates use of other equations having similar effect.

Since ambient and diffuse contributions are relatively insensitive to angle, these contributions are approximately equivalent regardless of the lens $A_1 = A_2 = A_3$; and $D_1 = D_2 = D_3$; and $(A_1 + D_1) = (A_2 + D_2) = (A_3 + D_3)$. Of course this assumption is an approximation for ideal surfaces. Optic component and real world abnormalities will be present and should be considered, which is why the above statement is that these values are only approximately equivalent. The above equations can be rewritten (for simplicity of expressions, hereafter) using a common variable for the ambient and diffuse components $$C_1 = AD + S_1$$

$$C_2 = AD + S_2$$

$$C_3 = AD + S_3$$

The value for $C_1$, $C_2$, and $C_3$ are known, since they are defined within the captured images. Values for AD, $S_1$, $S_2$, and $S_3$ are unknown at this stage. Without more, there are three equations with four unknowns. However, because the light source specifics were quantified in step 115 and because the position and angles of the camera lenses (from step 110) are known, values of $S_1$, $S_2$, and $S_3$ are able to be calculated, as shown by step 130. The specular color contribution ($S_1$, $S_2$, and $S_3$) for a point in an image equals the sum of the specular color contributions from each light source. A Phong lighting model (or other computation) can be utilized for these calculations (See step 135).

$$\text{specular} = K_s * I * \cos^n(\phi)$$

Ks: specular reflection coefficient
I: light intensity
φ: angle between camera lens and a vertex (twice the angle differences between the light source and the surface normal)

Once the values for specular components are calculated, equations and values exist for calculating AD, which represents the true color of the one or more points on the surface. After calculating the Specular component, where are X number of equations and X−1 number of unknowns, so a simultaneous equation is able to be solved for the variables (with an extra "equation" existing so that overall inaccuracies can be minimized). Step 140 indicates that the simultaneous solution for true color is calculated. In step 144, if there are additional points on the surface for which color is to be calculated then the process can repeat, which is shown by progressing from step 145 to step 120. Otherwise, the process can end in step 150.

It should be emphasized from the example above, that solving for each specular coefficient for each equation results in an "extra" value, which is strictly speaking unnecessary to solve for the AD value. This extra value can be used to minimize errors in the calculations and underlying models. This minimization can be utilized in various manners, such as being able to disregard a value/equation should that value be statistically deviant from other ones of the equations. There are many contextual reasons for this, such as having one of the videos imprecisely match the surface point when mapping a resulting image to the vertex. In other situations, one or more of the light sources may be temporarily blocked (by a physical obstruction), which doesn't affect other ones of the lens captured images. In another example, a relatively extreme angle for a single one of the camera lenses can have a disproportionate effect on calculation accuracy. All of these deviations can be statistically accounted for utilizing a variety of techniques enabled, at least in part by, having extra data for the mathematical models to improve accuracy and to minimize calculation abnormalities that would otherwise impact accuracy of the color determination.

Additionally, disclosure embodiments contemplate leveraging information from past calculations to ensure accuracy of future calculations. For example, if the lenses of a camera capture video, different time periods of the video can be used to calculate true color for the same surface point. For example, five different time frames can be sampled, where values from an average of the two "best" color values for a given vertex are used in calculating the true color of the point. This type of error mitigation can be especially useful for video captured in extreme environment subject to significant deviations. An example would be for an omnidirectional camera with fixed lenses attached to a moving vehicle—as lighting conditions, obstructions, movement, and other environmental factors are anticipated in such a context.

Figure 2A:
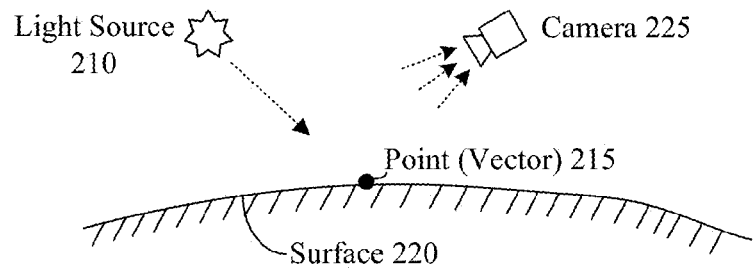
FIG. 2A shows a diagram for an illumination calculation in accordance with an embodiment of the disclosure.

FIG. 2A shows a diagram for an illumination calculation in accordance with an embodiment of the disclosure. The diagram shows a light source 210, which illuminates a point 215 on a surface 220. Camera 225 captures an image that includes point 215. The illumination of point 215 captured by camera 225 can be expressed as a diffuse component plus an ambient component plus a specular component.

Figure 2B:
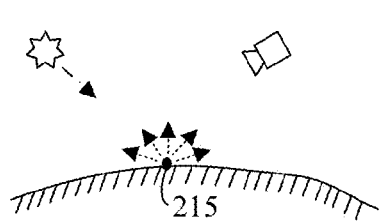
FIG. 2B shows a diagram for an illumination calculation for diffuse light in accordance with an embodiment of the disclosure.

FIG. 2B is an illustration for a diffuse component for the point 215. Diffuse light is an illumination that a surface point 215 receives from a light source that reflects equally in all directions. It does not matter where a camera is positioned relatively to the angle of the light, since the diffuse light component is angle insensitive with regards to color. Lamberts law (or other such equation) can be used to determine how much light from the light source 210 is received by the point. Different objects can receive different amounts of diffuse light. The amount of diffuse light that is captured by the camera can be described as equation 235. In question 235, $K_d$ is a reflection coefficient; I is an intensity, and the angle (θ) is a vector from the object to the light source.

Figure 2C:
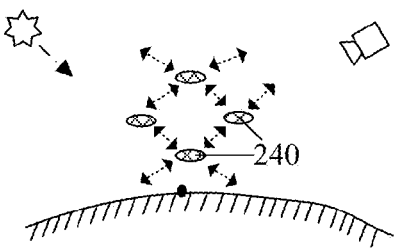
FIG. 2C shows a diagram for an illumination calculation for ambient light in accordance with an embodiment of the disclosure.

FIG. 2C shows a diagram for an illumination calculation for ambient light in accordance with an embodiment of the disclosure. Ambient light or background light is light that is scattered by the environment. That is, a set of objects 240 in an environment reflect light, which originates from a light source 210 and is captured by camera 225. Objects resulting in ambient light that is captured by the camera 225 may include walls, floors, ceilings, and other reflective and semi-reflective objects. Ambient light is independent of light position, object orientation, camera position or orientation. Ambient light has no direction. Radiosity is the calculation applicable for radiant light. The amount of ambient light that can be seen from an object is determined from equation 245. Light source 210 has an ambient light contribution of I. Different objects in an environment (like walls of a room) can reflect different amounts of ambient, which is defined by an ambient reflection coefficient $K_a$.

Figure 2D:
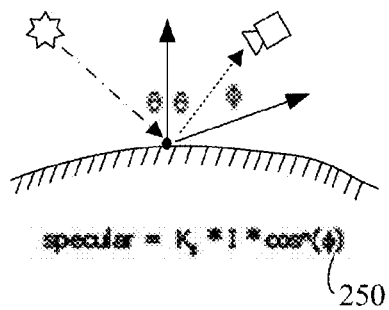
FIG. 2D shows a diagram for an illumination calculation for Specular light in accordance with an embodiment of the disclosure.

FIG. 2D shows a diagram for an illumination calculation for Specular light in accordance with an embodiment of the disclosure. Specular light is a minor-like reflection of light from a surface, in which light from a single incoming direction (a ray) is reflected into a single outgoing direction. Specular light can be shown as a bright spot on an object. The amount of specular light is highly dependent on an angle of rays of light from the light source 210 being reflected off the point 215 towards the camera 225. The specular component of light is sensitive to angle. Equation 250 shows an equation for calculating the specular component.

Most real world objects have some mixture of diffuse and specular reflective properties. The specular component (of a surface having specular reflective properties), reflectivity is nearly zero at all angles except at the appropriate reflective angle. That is, reflected radiation will follow a different path from incident radiation for all cases other than radiation normal to the surface. For the diffuse component (of a surface having a diffuse reflective properties), reflectivity is uniform so radiation is reflected in all angles equally or near equally. Diffusely reflecting surfaces (the diffuse component) has a property referred to as Labertian reflectance, which means that apparent brightness is the same regardless of the observer's angle of view. When a colored object has both diffuse and specular reflection usually only the diffuse component is colored. If a diffuse surface is colored, the reflected light is also colored, resulting in similar coloration of surrounding objects.

For purposes of this disclosure, a true color of a surface at a point is the color resulting from diffuse and ambient light. Color changes from this baseline resulting from the specular component are deviations from the true color, which is why the disclosure minimizes/eliminates the coloration changes present in the images that result from specular reflections.

Figure 3:
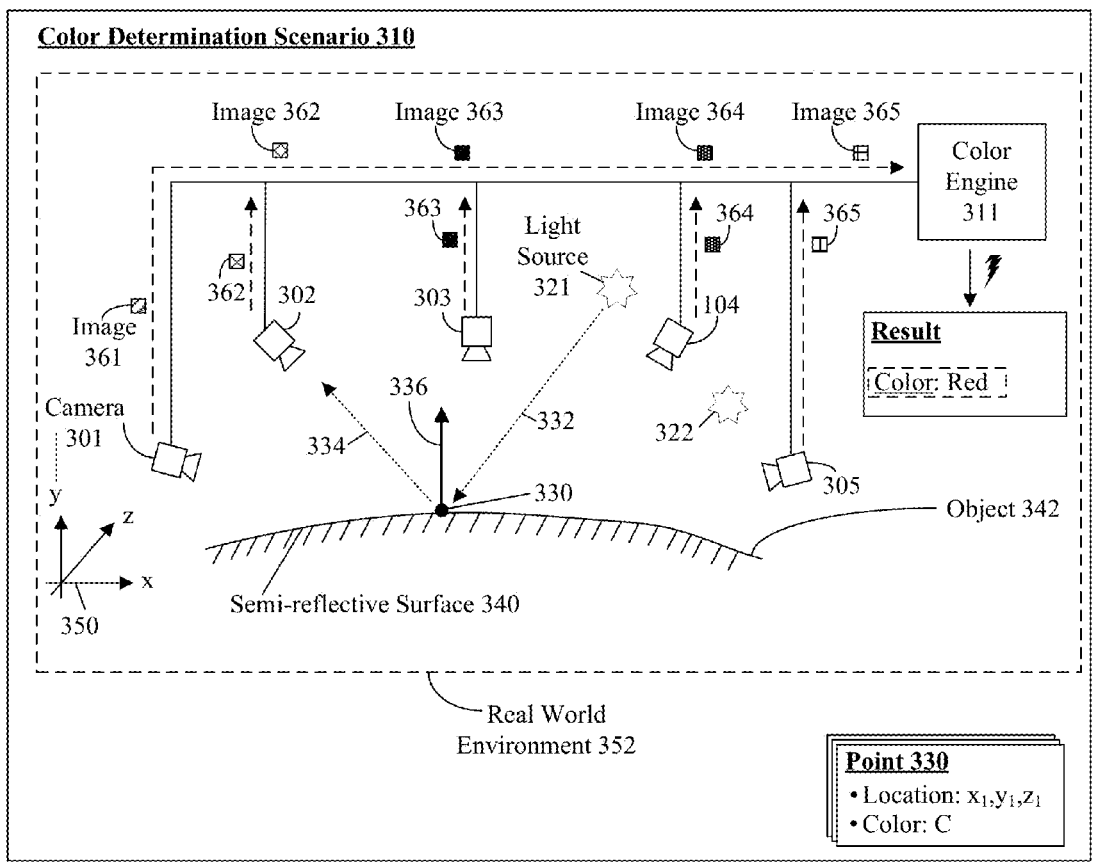
FIG. 3 illustrates a scenario for determining true color of a semi-reflective surface in accordance with an embodiment of the inventive arrangements disclosed herein.

FIG. 3 illustrates a scenario 310 for determining true color of a semi-reflective surface in accordance with an embodiment of the inventive arrangements disclosed herein. Multiple cameras 301, 302, 303, 304, 305 are shown, which capture images 361, 362, 363, 364, 365 that show point 330 illuminated by light source 321 and 322. Each of the images 361 can indicate different colors for the point 330. A color engine 311 can process the images 361-365 to determine a true color of the point 330, as detailed herein. The color engine 311 can determine true color for multiple points of a semi-reflective surface 340 of object 342 to increase the color accuracy of the surface 340 as shown in a captured set of images or images derived from a captured set of images. In one embodiment, the determination of true color can be part of a process of stitching together content of the images 361-365 into a single image, where the resulting image has a more realistic color for the surface 340 than any of the component images 361-365.

Color engine 311 can utilize images 361-365 from cameras 301-305 to determine the position of the point 330 as recorded within each image 361-365 (e.g., or video frame). Each of the points (including point 330) within the images 361-165 can be associated with a color (e.g. color C). Each color (e.g., color C) can be a combination of true color (e.g., DA) and specular contributions. In other words, specular contributions for a point's image color can be sensitive to camera 301-305 angle, while diffuse and/or ambient contributions for the point's coordinates are insensitive to camera 301-305 angle.

The processing of a set of images 361-165 performed by color engine 311 can be consistent with the process illustrated by FIG. 1, in one contemplated embodiment of the disclosure. Fewer or greater numbers of cameras 301-305 and light sources 321, 322 are contemplated. In one embodiment of the disclosure, a single camera (referred to as an omnidirectional camera or a three hundred and sixty degree camera) with multiple fixed lenses can be used, where each lens of the omnidirectional camera is equivalent to one of the shown cameras 301-305.

In scenario 310, a semi-reflective surface can be a portion of an object 342 within a real world environment 352. The object 342 can correspond to any real-world object including, but not limited to, a ball, a table, a wall, a vehicle, and the like. For example, object 342 can be a device having a semi-reflective surface 340 such as a display. A semi-reflective surface has an appreciable mixture of diffuse and specular reflective properties—such that a color value captured by one or more cameras 301-305 for the surface 340 varies appreciably based on angles involved.

The environment 352 can correspond to a three dimensional environment which can be mapped to one or more three dimensional coordinate systems (e.g., coordinate system 350). For example, the environment 352, cameras 301, light source 321, 322, object 342, surface 340, and surface point 330 can each be mapped to a coordinate triplet (e.g., x,y,z). The volumetric space of FIG. 3 models the real world environment 352.

As used herein, specular reflection can be the minor-like reflection of light (e.g., light ray 332) from a surface (e.g., surface 340), in which light from a single incoming direction (e.g., ray 332) can be reflected into a single outgoing direction (e.g., reflection 334). The angle of the reflection 334 depends on the surface normal 336. Specular reflection can be distinct from diffuse reflection, where incoming light is reflected in a broad range of directions. For example, if red surface is 50% diffuse and 50% specular and light source is white, then color of surface will appear from red to white color depending on viewing angle and intensity of light source.

Cameras 301-305 can be one or more optical instruments which can record images (e.g., digital encoding) and stored directly or transmitted to another location. Cameras 301-305 can capture images 361-365 of one or more portions of surface 340 (e.g., point 330) which can be conveyed to engine 311. It should be appreciated that cameras 301-305 can observe different colors at point 330 due to the different positions. That is, some cameras 301-305 can receive more or less specular reflection 334 from light sources 321, 322 resulting in color variations of point 330 within images 361-365.

Light sources 321, 322 can be one or more thermal bodies that, at a given temperature, emit a characteristic spectrum of black-body radiation. Light source 321, 322 can include, but is not limited to, a light bulb, the sun, a flame, and the like. Source 321, 322 can correspond to a spot light, an ambient light, and the like. It should be appreciated that source 321, 322 can emit a visible wavelength (e.g., white) or a portion of a visible wavelength (e.g., red, blue, green).

It should be appreciated that environment 352 can be a static or dynamic environment. That is, element characteristics 301-305, 321, 322, 342 can change over time. Characteristics of element 301-305 can include, but is not limited to, element settings (e.g., image quality settings, depth of field, aperture), element position, element state (e.g., device on, device off), and the like. Characteristics of element 321, 322 can include, but is not limited to, position, intensity, color, quantity, and the like. Characteristics of element 342 can include, but is not limited to, surface color, refractive index, and the like.

Figure 4:
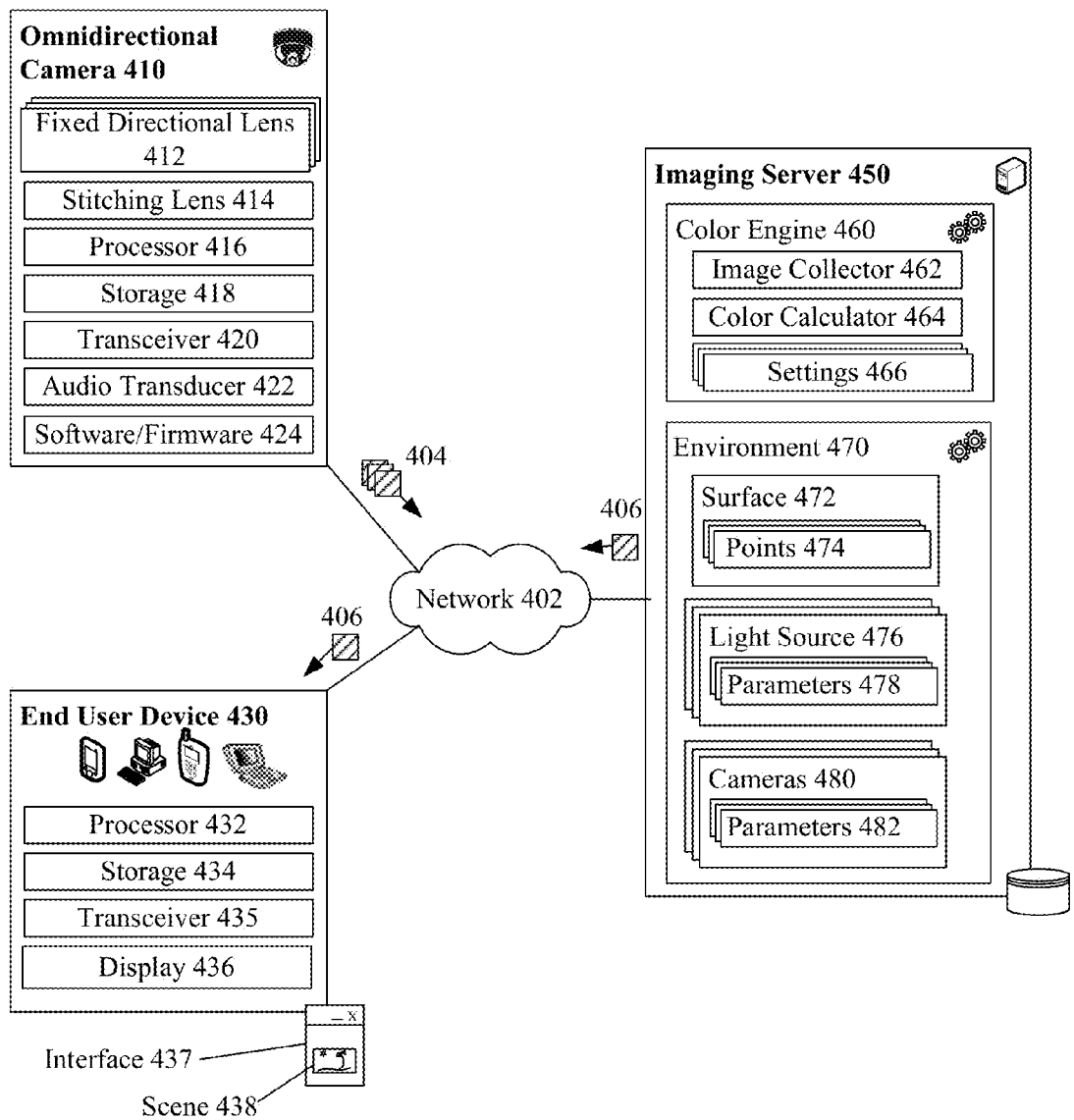
FIG. 4 shows a diagram of a system for determining a true color of semi-reflective surface in accordance with an embodiment of the inventive arrangements disclosed herein.

FIG. 4 shows a diagram of a system 400 for determining a true color of semi-reflective surface in accordance with an embodiment of the inventive arrangements disclosed herein. In system 400, an omnidirectional camera 410, an end-user device 430, and an imaging server 450 are communicatively linked via network 402.

In system 400, the omnidirectional camera 410, having multiple fixed directional lenses 412, can be replaced with a set of distinct cameras 301-305 as shown by FIG. 3 or can be replaced with a stereo camera. The important characteristics are that multiple different lenses exist that capture images (404) of a common point, where these images have different recorded color values for the common point. Thus, there needs to be a significant angle difference between the lenses, which results in different colors at a common point on a surface on an object (due to changes caused by the specular contribution).

Thus, the omnidirectional camera 410 (or set of distinct cameras in another embodiment) create set of images, where the images show a common point from a semi-reflective surface, where the point has differ color values in the set of images. The image server 450 determines a true color for the point in a manner consistent with the process of FIG. 1. The end-user device 430 is able to display images in true color, after these images have been processed by the image server 450. Omnidirectional camera 410 conveys images 404 over network 402 to imaging server 450 for processing. The processed results of the images 404 is a set of one or more resulting images 406 having true color. End user device 430 receives and displays these processed images 406.

The functional division of components and processes shown in system 400 is for one embodiment only, and other arrangements are contemplated. For example, in one embodiment, the image server 450 can be adapted/modified to perform the stitching functions illustrated as being performed by the omnidirectional camera 410. In another example, the end-user device 430 can perform one or more functions shown as being performed by the imaging server 450.

In system 400, the omnidirectional camera 410 can include two or more fixed directional lenses 412, a stitching lens 414, a processor 416, a storage space 418, a transceiver 420, an audio transducer 422, software/firmware 424, and/or other such components. The lenses 412 can together cover an aggregate arc greater than any individual lens alone. Because the lenses 412 are in a fixed position, a surrounding arc of environmental imagery is continuously being captured, which permits an end user to adjust viewing within this arc. The stitching function may be separate from any determinations of true color (especially if alpha blending techniques are used). Further, calculations for determining true color, as detailed herein, do require significant differences of lenses angles, which may require the lenses be an array of lenses positioned a significant difference from one another (such as images captured by two different cameras). The requisite significant angle will depend on the sensitive and accuracy of the camera lenses and environmental conditions, as is evident to one of ordinary skill Each lens 412 can be an assembly of components able to capture make images of objects electronically. Each lens 412 can have a characteristic focal length, aperture, sensor, image stabilizer, and lens mount.

The stitching lens 414 can be a wide lens angled upwards, which is used to capture imagery for a wide region in order to stich component images together. The stitching lens 412 can overlap with areas captured by each of the fixed directional lenses 412. Fidelity (pixel density) of the stitching lens 414 can be significantly less than fidelity of the fixed directional lenses 412.

The end user device 430 can be a device able to display one or more images within a scene 438 of a graphical user interface 437. Thus, end user device 430 can be a computer, a notebook, a tablet, a smart phone, a kiosk, an entertainment system, a media player, a television, and other consumer electronic devices. End user device 430 can include a processor 432, a storage space 434, a transceiver 435, a display 436, a user interface 437, and/or other such components. Scene 438 can be a two, three, or four dimensional computer generated scene including content of image 406. Scene 438 can be a static or dynamic scene.

The imaging server 450 can be a set of one or more machines that perform imaging functions. The imaging server can include one or more processors, storage spaces, a transceiver, program code able to be executed by the processors, and/or other such components. Imaging server 450 can include, but is not limited to, color engine 460 and an environment component 470.

Color engine 320 is able to determine/calculate a true color for points presented in multiple images, in a process consistent with that detailed in FIG. 1. Color engine 320 can include, but is not limited to, image collector 462, a color calculator 464, and a set of configurable settings 466. Color engine 430 may utilize images captured by two or more different omnidirectional cameras to determine a true color for points on a surface of an object.

Image collector 462 ensures that a single common point is identified across a set of images 404. Thus, the image collector 462 maps points captured in images across a set of images 404. The image collector 462 can select a subset of images 404 from which to determine true color in one embodiment. During selections, image collector 462 may consider image quality properties, such as: sharpness, noise, dynamic range, contrast, color accuracy, distortion, vignetting, exposure accuracy, lateral chromatic aberration, lens flares, color moiré, artifacts, and the like. In one embodiment, images of the image set 404 with low detail can be rejected and images with high detail can be utilized.

The color calculator 464 determines a true color of a set of one or more points and uses that true color when creating image 406. The true color is based on a combination of diffuse component and ambient component of light, which are insensitive to camera/lens angle.

Settings 466 can be one or more rules for establishing the behavior of system 400, server 450, camera 410, and/or device 430. Settings 466 may permit a set of processing rules to be established for different situations. Further, settings 466 can establish user-specific, camera 410 specific, and/or context specific processing parameters.

The environment component 470 defines variables of significance for true color determinations. The environment component 470 defines surface 472 characteristics, a set of surface points 474. Light source 476 position, intensity, color, and other parameters 478 are computed and defined by environment 470 component 470. Likewise, a position, angle, and imaging characteristics (parameters 482) of the lenses can be defined as cameras 480 of the environment model.

The images 404, 406 can be digital artifacts that specify image details, so that a machine is able to display and/or print an image using the specified attributes encoded within the digital artifacts. The images 404, 406 can conform to a number of raw image formats. Formats need not be the same from image-to-image, and may vary. Image 312 format can conform to a, Joint Photographic Experts Group (JPEG), Portable Network Graphic (PNG), and/or other such standards or derivatives thereof. It should be appreciated that image 312 can be a portion of a video content such as a Moving Picture Experts Group (MPEG), Audio Video Interleave (AVI), and other video formats.

Network 402 can include any hardware/software/and firmware necessary to convey data encoded within carrier waves. Data can be contained within analog or digital signals and conveyed though data or voice channels. Network 402 can include local components and data pathways necessary for communications to be exchanged among computing device components and between integrated device components and peripheral devices. Network 402 can also include network equipment, such as routers, data lines, hubs, and intermediary servers which together form a data network, such as the Internet. Network 402 can also include circuit-based communication components and mobile communication components, such as telephony switches, modems, cellular communication towers, and the like. Network 402 can include line based and/or wireless communication pathways.

Storage spaces 418, 423, and/or a storage space of server 450 represent data stores able to be physically implemented within any type of hardware including, but not limited to, a magnetic disk, an optical disk, a semiconductor memory, a digitally encoded plastic memory, a holographic memory, or any other recording medium. Each of the storage spaces can be a non-transitory storage medium, which excludes carrier waves, signal mediums, and other forms of energy. Storage spaces can be a stand-alone storage unit as well as a storage unit formed from a plurality of physical devices. Additionally, data can be stored within storage spaces in a variety of manners. For example, data can be stored within a database structure or can be stored within one or more files of a file storage system, where each file may or may not be indexed for data searching purposes. Further, storage spaces can utilize one or more encryption mechanisms to protect stored data from unauthorized access.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
one or more computing devices identifying a plurality of images of an object captured from a set of lenses positioned at different angles;
at least one of the one or more computing devices determining a common point of the object present in the plurality of images, which has a color value that differs among the images;
at least one of the one or more computing devices mathematically expressing color as a set of equations, one of the equations for each of the plurality of images, wherein the equations comprises a recorded color value for the point, an ambient contribution, a diffuse contribution, and a specular contribution;
at least one of the one or more computing devices making the ambient contribution and the diffuse contribution for color as within the set of equations approximate equal across the set of equations;
at least one of the one or more computing devices at least one of the one or more computing devices quantifying a specular contribution at the common point for at least a subset of the plurality of images;
at least one of the one or more computing devices substituting the quantified specular contribution value into a corresponding variable and solving the simulations equations for a value of the ambient and diffuse contribution at the point;
at least one of the one or more computing devices establishing true color of the point as the ambient and diffuse contribution, wherein the established true color is a value different from any value recorded for the point within any of the images; and
at least one of the one or more computing devices creating an image or modifying at least one of the plurality of images to specify the true color as a color for the point in the created or modified image.

2. The method of claim 1, further comprising:
at least one of the one or more computing devices calculating a position, color, and intensity of each light source that illuminates the object in the plurality of images; and
at least one of the one or more computing devices quantifying the specular contribution for each image utilizing the position, color, and intensity of each light source.

3. The method of claim 1, further comprising:
at least one of the one or more computing devices quantifying the specular contribution for each image by determining a sum of a specular contribution of each of a plurality of different light sources that illuminates the object in the plurality of images.

4. The method of claim 1, wherein the true color is a color expressed within the plurality of images for the point by contributions that are insensitive to camera angle, wherein the specular contribution that is removed when determining the true color is sensitive to camera angle causing a recorded color value to change depending on a camera angle.

5. The method of claim 1, wherein the surface of the object at the point is a semi-reflective surface.

6. The method of claim 1, wherein the set of lenses are lenses of a single camera, which capture the images of the object at within one second of each other.

7. The method of claim 1, wherein the set of lenses are lenses of a plurality of different cameras, which result in the common point being captured at significantly different angles.

8. A computer program product comprising a non-transitory computer readable storage medium having computer usable program code embodied therewith, the computer usable program code comprising:
computer usable program code stored in a non-transitory storage medium, if said computer usable program code is executed by a processor it is operable to identify a plurality of images of an object captured from a set of lenses positioned at different angles;
computer usable program code stored in a non-transitory storage medium, if said computer usable program code is executed by a processor it is operable to determine a common point of the object present in the plurality of images, which has a color value that differs among the images;

computer usable program code stored in a non-transitory storage medium, if said computer usable program code is executed by a processor it is operable to mathematically express color as a set of equations, one of the equations for each of the plurality of images, wherein the equations comprises a recorded color value for the point, an ambient contribution, a diffuse contribution, and a specular contribution;

computer usable program code stored in a non-transitory storage medium, if said computer usable program code is executed by a processor it is operable to make the ambient contribution and the diffuse contribution for color as within the set of equations approximate equal across the set of equations;

computer usable program code stored in a non-transitory storage medium, if said computer usable program code is executed by a processor it is operable to quantify a specular contribution at the common point for at least a subset of the plurality of images;

computer usable program code stored in a non-transitory storage medium, if said computer usable program code is executed by a processor it is operable to substitute the quantified specular contribution value into a corresponding variable and solving the simulations equations for a value of the ambient and diffuse contribution at the point;

computer usable program code stored in a non-transitory storage medium, if said computer usable program code is executed by a processor it is operable to establish true color of the point as the ambient and diffuse contribution, wherein the established true color is a value different from any value recorded for the point within any of the images; and computer usable program code stored in a non-transitory storage medium, if said computer usable program code is executed by a processor it is operable to create an image from a set of the plurality of images or to modify at least one of the plurality of images to specify the true color as a color for the point in the created or modified image.

9. The computer program product of claim 8, further comprising:

computer usable program code stored in a non-transitory storage medium, if said computer usable program code is executed by a processor it is operable to calculate a position, color, and intensity of each light source that illuminates the object in the plurality of images; and computer usable program code stored in a non-transitory storage medium, if said computer usable program code is executed by a processor it is operable to quantify the specular contribution for each image utilizing the position, color, and intensity of each light source.

10. The computer program product of claim 8, further comprising:

computer usable program code stored in a non-transitory storage medium, if said computer usable program code is executed by a processor it is operable to quantify the specular contribution for each image by determining a sum of a specular contribution of each of a plurality of different light sources that illuminates the object in the plurality of images.

11. The computer program product of claim 8, wherein the true color is a color expressed within the plurality of images for the point by contributions that are insensitive to camera angle, wherein the specular contribution that is removed when determining the true color is sensitive to camera angle causing a recorded color value to change depending on a camera angle.

12. The computer program product of claim 8, wherein the surface of the object at the point is a semi-reflective surface.

13. The computer program product of claim 8, wherein the set of lenses are lenses of a single camera, which capture the images of the object at within one second of each other.

14. The computer program product of claim 8, wherein the set of lenses are lenses of a plurality of different cameras, which result in the common point being captured at significantly different angles.

15. A system comprising:

one or more processors;

one or more non-transitory storage mediums storing program instructions that the one or more processors execute;

computer usable program code comprising at least a portion of the program instructions to identify a plurality of images of an object captured from a set of lenses positioned at different angles;

computer usable program code comprising at least a portion of the program instructions to determine a common point of the object present in the plurality of images, which has a color value that differs among the images;

computer usable program code comprising at least a portion of the program instructions to mathematically express color as a set of equations, one of the equations for each of the plurality of images, wherein the equations comprises a recorded color value for the point, an ambient contribution, a diffuse contribution, and a specular contribution;

computer usable program code comprising at least a portion of the program instructions to make the ambient contribution and the diffuse contribution for color as within the set of equations approximate equal across the set of equations;

computer usable program code comprising at least a portion of the program instructions to quantify a specular contribution at the common point for at least a subset of the plurality of images;

computer usable program code comprising at least a portion of the program instructions to substitute the quantified specular contribution value into a corresponding variable and solving the simulations equations for a value of the ambient and diffuse contribution at the point;

computer usable program code comprising at least a portion of the program instructions to establish true color of the point as the ambient and diffuse contribution, wherein the established true color is a value different from any value recorded for the point within any of the images; and computer usable program code comprising at least a portion of the program instructions to create an image from a set of the plurality of images or to modify at least one of the plurality of images to specify the true color as a color for the point in the created or modified image.

16. The system of claim 15, further comprising:

computer usable program code comprising at least a portion of the program instructions to calculate a position, color, and intensity of each light source that illuminates the object in the plurality of images; and computer usable program code comprising at least a portion of the program instructions to quantify the specular contribution for each image utilizing the position, color, and intensity of each light source.

17. The system of claim 15, further comprising:
computer usable program code comprising at least a portion of the program instructions to quantify the specular contribution for each image by determining a sum of a specular contribution of each of a plurality of different light sources that illuminates the object in the plurality of images.

18. The system of claim 15, wherein the true color is a color expressed within the plurality of images for the point by contributions that are insensitive to camera angle, wherein the specular contribution that is removed when determining the true color is sensitive to camera angle causing a recorded color value to change depending on a camera angle.

19. The system of claim 15, wherein the surface of the object at the point is a semi-reflective surface.

20. The system of claim 15, wherein the set of lenses are lenses of a single camera, which capture the images of the object at within one second of each other.

\* \* \* \* \*